United States Patent [19]

Henry

[11] Patent Number: 5,253,820
[45] Date of Patent: Oct. 19, 1993

[54] CAPTIVE CABLE COIL AND ITS APPLICATION TO A REGULATOR FOR DEPLOYING A LENGTHENING PIECE OF A SPACE INSTRUMENT

[75] Inventor: Jean-Pierre Henry, Valbonne, France

[73] Assignee: Aerospatiale Societe Nationale Industrielle, France

[21] Appl. No.: 692,154

[22] Filed: Apr. 26, 1991

[30] Foreign Application Priority Data

May 18, 1990 [FR] France ................................ 90 06264

[51] Int. Cl.⁵ .......................................... B65H 75/02
[52] U.S. Cl. ..................................... 242/99; 242/77.1; 242/85.1; 242/117
[58] Field of Search ........................ 242/99, 77.1, 85.1, 242/86, 115, 116, 117, 118.41; 254/371, 374

[56] References Cited

U.S. PATENT DOCUMENTS

| | | | |
|---|---|---|---|
| 2,118,731 | 5/1938 | Knott | 242/85.1 |
| 2,587,707 | 3/1952 | Dever | 242/85.1 |
| 3,339,860 | 9/1967 | Riggles, Jr. | 254/374 |
| 3,985,359 | 10/1976 | Moore | 242/118.41 |
| 4,101,095 | 7/1978 | Carter | 242/115 |
| 4,412,661 | 11/1983 | Wise et al. | 242/116 |
| 4,702,429 | 10/1987 | Black | 242/116 |
| 4,739,945 | 4/1988 | Yokoe | 242/118.41 |
| 4,802,638 | 2/1989 | Burger et al. | 242/85.1 |
| 5,050,813 | 9/1991 | Ishikawa et al. | 242/85.1 |

FOREIGN PATENT DOCUMENTS

| | | | |
|---|---|---|---|
| 216432 | 7/1961 | Austria | 242/118.41 |
| 1505831 | 11/1967 | France . | |
| 2470727 | 6/1981 | France . | |
| 8806564 | 9/1988 | PCT Int'l Appl. . | |
| 195895 | 5/1965 | Sweden | 242/117 |

*Primary Examiner*—Daniel P. Stodola
*Assistant Examiner*—John Q. Nguyen
*Attorney, Agent, or Firm*—Pearne, Gordon, McCoy & Granger

[57] ABSTRACT

So as to adjust the deployment of a lengthening piece of a space instrument, a captive cable coil (34) coupled to a centrifugal brake by a speed multiplier is used. The cable (40) is wound onto the coil (34) in the form of a single strand imprisoned in a roughly helical-shaped throat (38) formed, for example by machining, on the outer surface of the coil. One outer portion (42a) of the partition separating two adjacent spires of the throat is folded down onto the cable so as to prevent its volume from swelling.

4 Claims, 2 Drawing Sheets

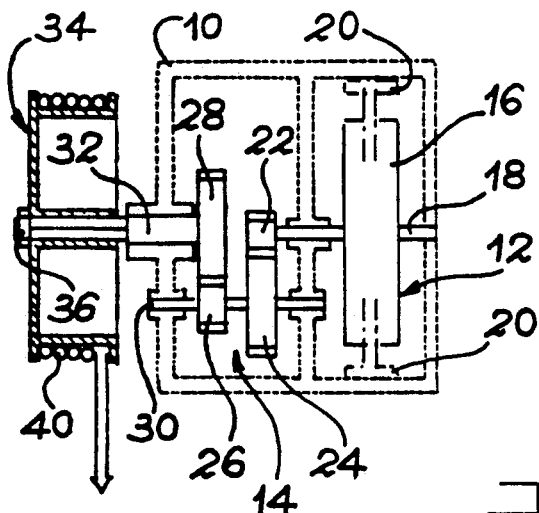
FIG. 1
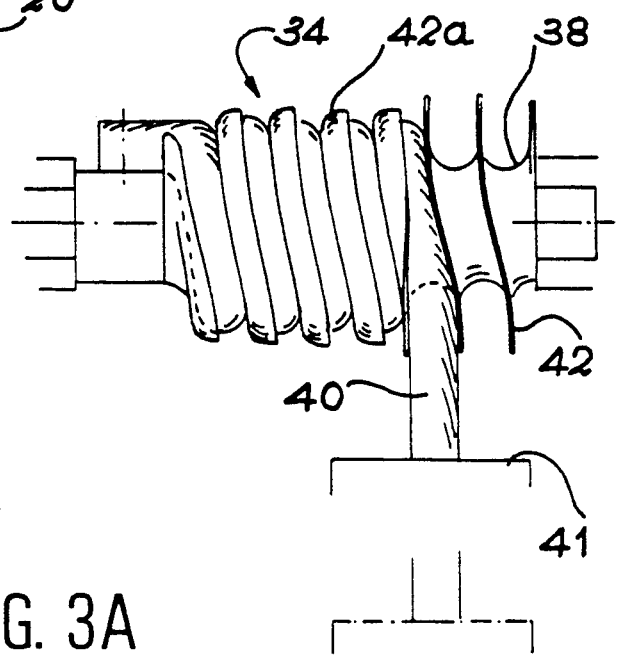
FIG. 2
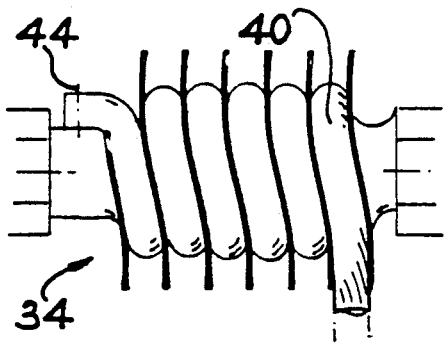
FIG. 3A
FIG. 3B
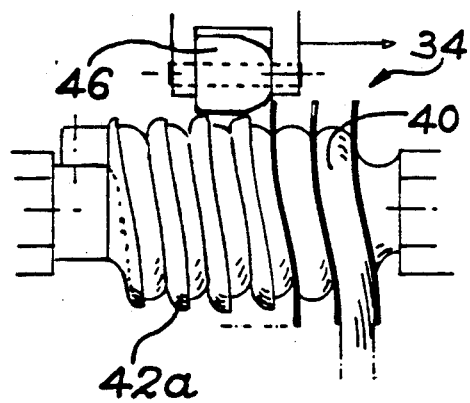
FIG. 3C

CAPTIVE CABLE COIL AND ITS APPLICATION TO A REGULATOR FOR DEPLOYING A LENGTHENING PIECE OF A SPACE INSTRUMENT

FIELD OF THE INVENTION

The invention concerns a coil with a captive cable designed in such a way as to be used in a regulator for deploying a lengthening piece, such as a solar generator or an antenna equipping a space instrument. The invention also concerns a cable regulator comprising such as a captive cable coil.

BACKGROUND OF THE INVENTION

Space instruments, such as satellites, are normally equipped with a certain number of lengthening pieces able to be deployed, namely solar generators, antenna reflectors, poles, etc. Throughout the satellite launching phase, these lengthening pieces are kept in a folded back position so as to firstly reduce the spatial requirement and secondly avoid damaging them. The keeping of the lengthening pieces in this folded back position is ensured by stacking devices constituted, for example, by bolts traversing the various panels constituting each solar generator.

When the satellite is placed into orbit, pyrotechnic shears are triggered so as to cut the stacking bolts and to free the solar generators or similar lengthening pieces. The actual deployment is then ensured by elastic members mounted on the hinges which each connect panels of the solar generator.

These elastic members are usually constituted by torsional springs which exert between adjacent panels a relatively high deployment torque. So as to ensure that excessive impacts do not occur after deployment, it is necessary to regulate the speed for deploying the panels.

To this effect, cable deployment regulators are normally used which include a coil mounted on a shaft connected to a centrifugal brake by a speed multiplier mechanism. A cable, initially wound onto the coil, is secured via its extremity onto the lengthening piece whose deployment is to be regulated. When deployment of the lengthening piece is triggered, the cable is unwound from the coil and the latter drives in rotation, at a speed increased by the speed multiplier, the rotary feeders of the centrifugal brake. Friction blocks integral with these feeders then come into contact with a stationary track, which has the effect of adjusting the speed of rotation and accordingly adjusting deployment of the lengthening piece.

In such a cable deployment regulator, a braided metallic cable is normally used having a bending rigidity which tends to spontaneously bring it back to the almost rectilinear state, and thus to unwind it from a coil in the free state. For this reason, the coil on which the cable is intially wound is normally placed inside a housing which also contains the centrifugal brake and the speed multiplier mechanism. However, given the fact that it is esential to have a certain amount of play between the cable and the housing, the bending rigidity of the cable tends to make the volume of the latter swell on the coil when this coil is blocked and when any significant tension is exerted on the cable. In the most unfavorable conditions, such a volume swell may result in the cable jamming and the lengthening piece not being deployed. When this lengthening piece is a solar generator, this may thus result in the equipment embarked on the satellite being totally unusable.

In practice, the risks mentioned above are that much more likely when the mechanisms for deploying lengthening pieces equipping satellites are tested a number of times before the satellite is sent into space. In fact, it is necessary after each of these tests to rewind the cable onto the coil through a small outlet window of the cable formed in the housing, that is virtually without any visibility.

As regards equipment functioning on the ground, it has already been envisaged to keep a captive cable on a coil by means of a glue which does not prevent unwinding of the cable as and when desired. This technique is in particular used in certain cases so as to ensure the keeping in a coiled position the wire connecting a wire-guided missile to the ground.

However, this technique has a certain number of drawbacks which render it virtually unusable in certain spheres and especially in spatial applications. Thus, the presence of glue, some of whose particles are pulled up at the moment of deployment, would be unacceptable in spatial applications as it would result in depositing pollutive particles on the large number of optical and other types of instruments equipping satellites. In addition, the cable for regulating deployment moves on pulleys and the presence of glue particles on this cable would risk the latter jamming. In addition, the extreme temperature conditions sustained by the various devices equipping spatial instruments (temperature variation of between about $-170°$ C. and $100°$ C.) would result in changing the characteristics of all existing glues.

SUMMARY OF THE INVENTION

The object of the invention is to provide a new type of captive cable coil not having any of the drawbacks arising from usage of glue and whose use in a regulator for deploying a lengthening piece of a spatial instrument is able to suppress risks of volume swell and thus any jamming of the cable at the time it is deployed.

The object of the invention is also to apply such a captive cable coil to a regulator for deploying a lengthening piece of a space instrument.

According to the invention, the first of these objectives is attained with the aid of a captive cable coil, wherein the coil comprises on its outer surface a roughly helical-shaped throat on which the cable is wound, this throat comprising outside the cable a holding zone having a width smaller than that of the cable.

In the coil embodied in this way, the cable is imprisoned inside the helical throat and its unwinding is only possible when the force exerted on the cable is sufficient so as to allow it to traverse the holding zone, either by deforming this zone or by deforming the cable, or by simultaneously deforming both of them.

In one preferred embodiment of the invention, the throat contains a single cable ply or strand and the holding zone is formed by one external portion of a partition separating two adjacent spires of said throat folded back onto the cable and which deforms permanently when the cable leaves the throat. Folding back onto the wire of the outer portion of the partition may be effected by crimping or chasing.

In a coil constituted in this way, the partition may be advantageously embodied by a single piece with one central portion of the coil, the throat being machined in a metallic block constituting the latter.

In one variant, the coil may include a stack alternately formed of a first washer with a relatively small diameter and having a thickness roughly equal to the diameter of the wire, and a second thinner washer with a larger diameter forming said partition.

In this latter case, the first and second washers may be flat, the second washers having external scallopings aligned for passage of the cable from one spire to another.

The first washers may also may deformed by twisting over a distance roughly equal to their thickness so as to define aligned discontinuities, the second washers being interrupted on both sides of these discontinuities to allow for passage of the cable from one spire to another.

Furthermore, the second objective of the invention is attained with the aid of a cable regulator for deploying a deployable lengthening piece of a space instrument and including a centrifugal brake engaged by means of a speed multiplier on a coil on which a cable is wound with the opposing extremity of this cable being secured to said deployable lengthening piece, wherein the coil is a captive cable coil, as defined previously, mounted by detachable means on an outlet shaft of the speed multiplier outside a housing containing the latter and the centrifugal brake.

The association of these various characteristics makes it possible, after each test of the mechanism for deploying a deployable lengthening piece of a space instrument, to replace the captive cable coil by an identical coil belonging to the same production batch or one having the same characteristics.

BRIEF DESCRIPTION OF THE DRAWINGS

Various embodiments of the invention are now to be described by way of non-restrictive examples with reference to the accompanying drawings on which:

FIG. 1 is a front longitudinal sectional view diagrammatically illustrating a cable deployment regulator conforming to the invention;

FIG. 2 is a front view showing on larger scale a first embodiment of the captive cable coil equipping the deployment regulator of FIG. 1, the coil being represented when the lengthening piece is in the course of being deployed;

FIGS. 3A, 3B and 3C are views similar to those of FIG. 2 showing three successive stages for production of the captive cable coil;

DETAILED DESCRIPTION OF THE PREFERRED EMBODIMENTS

Figure 5:
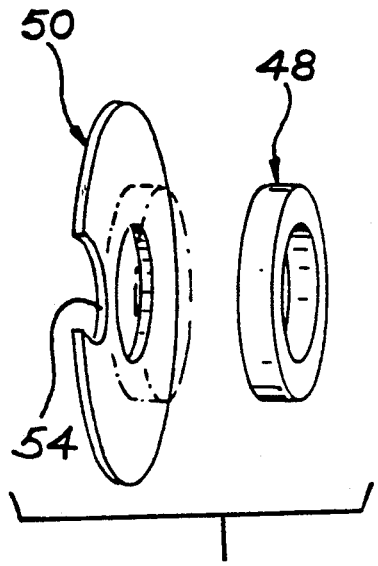
FIG. 5 is an exploded perspective view showing the two types of washers stacked alternately so as to form the coil illustrated on FIG. 4.

FIG. 1 diagrammatically shows a cable regulator intended to regulate the speed for deploying a deployable lengthening piece, such as a solar generator equipping an artificial satellite or a similar space instrument. This cable regulator includes a housing 10 provided to be secured to the body of the satellite close to the lengthening piece whose deployment needs to be provided after the placing in orbit. This housing 10 delimits two compartments in which a speed multiplier mechanism 14 and a feeder centrifugal brake 12 are housed. These two devices, well-known to specialists in this field, shall not be described here in detail.

The centrifugal brake 12 comprises a rotor 16 supported by a shaft 18 inside the housing 10, this rotor 16 being equipped with feeders (not shown) able to be moved radially under the effect of the centrifugal force so as to apply friction blocks 20 against a track defined by the internal surface of the housing 10.

The speed multiplier mechanism 14 includes a gear 22 mounted at the extremity of the shaft 18, gears 24 and 26 mounted on a shaft 30 parallel to the shaft 18, and a gear 28 mounted on a shaft 32 aligned with the shaft 18. In addition, the gear 22 is engaged on the gear 24 and the gear 26 is engaged on the gear 28 so that rotation of the shaft 32 is transmitted to the shaft 18 with an increased speed defined by the respective diameters of the gears.

The cable regulator of the invention shown on FIG. 1 further includes a captive cable coil 34 mounted on the shaft 32 outside the housing 10 with the aid of a nut 36 of a similar member enabling an operator to easily replace the coil 34.

In accordance with one main characteristic of the invention, the coil 34 comprises on its outer surface a throat 38 (FIG. 2) which approximately has the shape of a spiral and on which in the form of a single spire a cable 40 is wound imprisoned on the throat 38 in a way to be described subsequently. One first extremity of the cable 40 is secured to the coil 34, whereas the opposing extremity of this cable is secured to the deployable lengthening piece 41 whose deployment is desired to be controlled.

In one first embodiment of the invention shown on FIG. 2, the captive cable coil 34 is constituted by a single piece by machining a metallic block having the shape of a revolution cylinder. This metallic block is made of a highly ductile material, such as aluminium or copper.

More specifically, the throat 38 is helical-machined on the outer surface of this metallic block so as to form between the adjacent spires of this throat an extremely thin helical partition 42, as shown on FIG. 3A. The width of the throat 38 machined in the metallic block is roughly equal to the diameter of the cable 40 and its depth is larger than this diameter.

In a second stage for producing the captive cable coil 34 shown on FIG. 3B, one first extremity of the cable 40 is secured at 44 by any suitable device to one extremity of the coil 34 and this cable 40 is wound onto a helical throat 38 in the form of a single strand. In these conditions, the outer portion of the helical partition 42 projects beyond the cable 40.

The final stage for producing the captive cable coil 34 shown on FIG. 3C consists of enclosing the cable 40 in the throat 38 by folding back the outer portion 42a of the partition 42 with the aid of a crimping wheel 46. At the end of this operation, the helical throat 38 has outside the cable 40 a width smaller than the diameter of the latter. As a result, the cable 40 is unable to slip out of the coil 34 by virtue of the natural stiffness of the cable so that any risk of volume swell possibly resulting in jamming this cable is prevented.

Furthermore, given the fact that the immobilization of the cable 40 on the coil 34 is embodied without having to make use of a booster material, such as glue, the aforesaid drawbacks inherent to the use of such an additional product are suppressed.

With reference again to FIG. 2, it can be seen that the deployment of the lengthening piece 41 connected to the extremity of the cable 40 opposing the extremity connected to the coil 34 is expressed by a progressive unwinding of the cable 40 outside the coil 34 which has the effect of bringing back, at least partly, the outer portion of the partition 42 previously folded back with the aid of the wheel into a state close to its initial state.

Of course, the thickness of the partition 42 and the length of the folded back outer portion of this partition are determined initially so as to firstly guarantee keeping the cable 40 in the throat 38 prior to controlling deployment of the lengthening piece, especially under the effect of vibrations occuring at the time the satellite is launched, and secondly to ensure that the resistant torque exerted by this outer portion folded back onto the cable 40 when being unwound is not too large to oppose unwinding of the cable. This latter criterion generally requires a maximum resistant force of about 3N. The nature of the highly ductile metal in which the coil 34 is formed also contributes to obtaining the desired compromise between these two extreme values.

Figure 4:
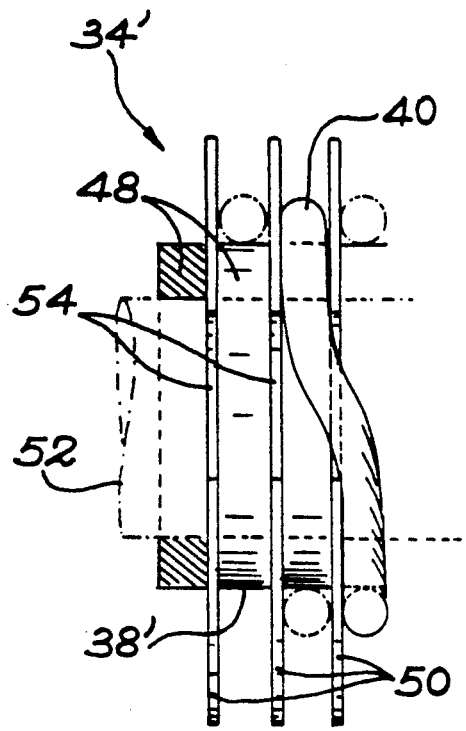
FIG. 4 is a front partial sectional view illustrating a second embodiment of the captive cable coil of the invention prior to crimping of the wire on the coil.

FIGS. 4 and 5 illustrate a second embodiment of the captive cable coil of the invention. In this second embodiment, the coil 34', instead of being embodied in the form of a single piece from a machined metallic block, is constituted here by a stack of two types of washers 48 and 50 disposed alternately on a spindle 52.

The washers 48 and 50 shown separately on FIG. 5 are flat washers having different dimensions. More specifically, the washers 48 are thick washers having a small diameter, whereas the washers 50 are much thinner washers with a larger diameter.

As can be seen on FIG. 4, the thickness of the washers 48 is roughly equal the diameter of the cable 50 so that, when the washers 48 and 50 are stacked alternately, they form juxtaposed circular throats intercommunicating via an external scalloping 54 formed in each of the washers 50, the scallopings 54 of all the washers 50 being aligned along a generating line of the coil 34'. The circular throats formed between the washers 50 and the scallopings 54 formed in the latter thus define a throat 38' roughly having the shape of a spiral in which the cable 40 is able to be coiled in the form of a single spire.

The outer diameter of the washers 50 exceeds the outer diameter of the washers 48 by a value two times larger than the diameter of the cable 40 so that the outer portion of each of the washers 50 projects beyond the cable 40 when the latter is wound onto the coil 34' in the manner described above. Moreover, the washers 50 are made of a highly ductile metal, such as aluminium or copper. Accordingly, the cable 40 can be imprisoned by folding back the outer edge of the washers 50 with the aid of a wheel, as described previously with reference to FIG. 3C as regards the first embodiment of the coil. The width of the roughly helical or spiral throat 38' is then smaller than the diameter of the cable 40 outside the latter so that this cable is imprisoned on the coil 34' as long as the traction force resulting from deployment of the lengthening piece is not exerted on the cable 40.

Figure 7:
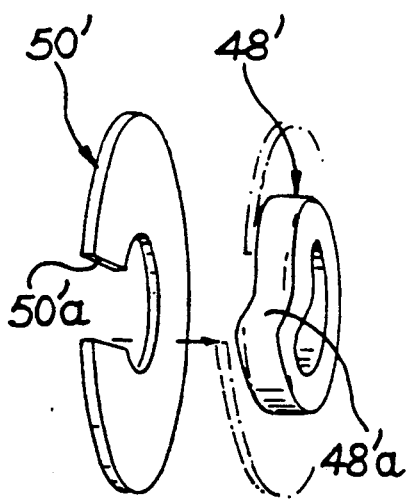
FIG. 7 is an exploded perspective view showing the two types of washers stacked alternately so as to form the captive cable coil shown on FIG. 5.
Figure 6:
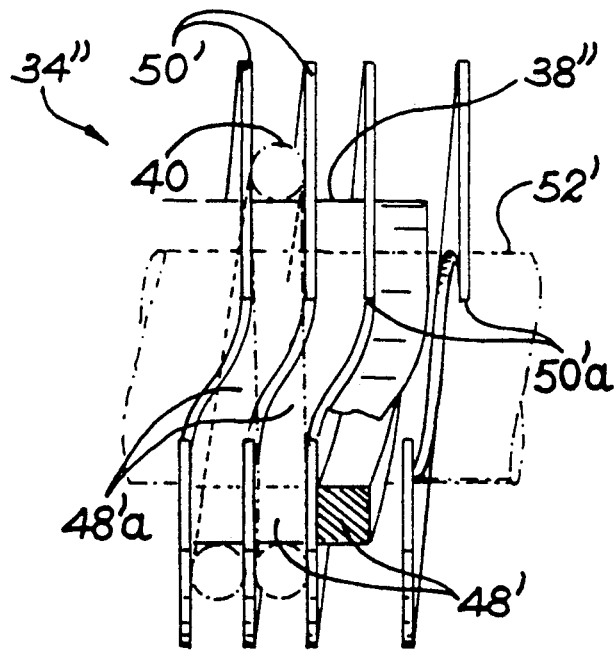
FIG. 6 is a front partial sectional view illustrating a third embodiment of the invention.

FIGS. 6 and 7 show a third embodiment of the invention constituting a variant of the embodiment described immediately above with reference to FIGS. 4 and 5.

More specifically, the captive cable coil 34'' shown on FIG. 6 is formed, as in the embodiment of FIG. 4, of a stacking of two types of washers 48' and 50' placed alternately around a spindle 52'. The washers 48' are again thick washers with a relatively small diameter, whereas the washers 50' are highly ductile metallic washers and are thinner and have a larger diameter. More precisely, the thickness of the washers 48' is roughly equal the diameter of the cable 40 and the diameter of the washers 50' is more than twice the diameter of the cable 40.

This embodiment of FIGS. 6 and 7 is mainly distinguished from that of FIGS. 4 and 5 by the fact that, instead of being flat washers, the washers 48' are deformed by twisting over a distance roughly equal their thickness so as to form a spire over most of their circumference, except for a discontinuity 48'a connecting the extremities of this spire. Furthermore, the washers 50', initially flat, are interrupted at 50'a over an angular sector equal to at least the one formed by each of the discontinuities 48'a of the washers 48'.

As shown on FIG. 6, the washers 48' and 50' are stacked alternately so that the discontinuities 48'a of the washers 48' and the interruptions 50'a of the washers 50' are aligned along a generating line of the coil 34'. This characteristic makes it possible to form between the washers 50' a throat 38'' whose shape here is virtually that of a spiral, contrary to the case with the throat 38' in the embodiment of FIG. 4. The captive cable coil 34'' moreover has characteristics similar to those of the preceding embodiments, in other words, the cable 40, which is wound in the form of a single spire on the throat 38'', is kept in the latter by folding back the outer projecting portion of the washers 50' with the aid of a wheel in accordance with the description given earlier with reference to FIG. 3C.

Of course, the invention is not merely restricted to the embodiments described above by way of examples, but covers all its possible variants. Thus, one can readily understand that, instead of being constituted by a folded back outer portion of a partition separating the adjacent spires of the roughly spiral-shaped throat formed on the coil, the cable 40 may be imprisoned by reducing by other means the width of the throat to a value lower than that of the diameter of the cable outside the latter. The embodiment described with reference to FIG. 2 and FIGS. 3A to 3C does, however, have the advantage of being particularly simple and easy to implement.

What is claimed is:

1. A cable regulator for the deployment of a deployable lengthening piece of a space instrument, said cable regulator including a coil, a centrifugal brake geared onto said coil through a speed multiplier, and a cable wound on an outer surface of said coil, said cable having a first extremity secured to said coil and a second extremity secured to said deployable lengthening piece, wherein the cable is wound to form only one layer on said coil, said single layer being contained in a substantially helical-shaped throat formed on the outer surface of said coil, a partition separating two adjacent spires of said throat, said partition comprising an external portion which is folded back onto the cable, in order to captively contain said cable on said coil, said external portion being permanently deformed when the cable is unwound from said coil during payout, and wherein said coil is mounted by dismantable fixing means on a shaft of the speed multiplier, outside a housing containing the speed multiplier and the centrifugal brake.

2. A cable regulator according to claim 1, wherein said coil comprises a single metallic block from which projects the partition and in which is machined the throat.

3. A cable regulator according to claim 1, wherein said coil comprises a stacking formed alternately of a first washer with a relatively small diameter and a thickness substantially equal to the diameter of the cable, and a second thinner washer with a larger diameter, said second washer forming said partition and having external notches aligned for passage of the cable from one spire to another.

4. A cable regulator according to claim 1, wherein said coil comprises a stacking formed alternately of a first washer with a relatively small diameter and a thickness substantially equal to the diameter of the cable, and a second thinner washer with a larger diameter, said second washer forming said partition, wherein the first washers are deformed by twisting over a distance roughly equal to their thicknesses so as to define aligned discontinuities, cut-outs provided by the second washers being adjacent the discontinuities to allow cable to pass from one spire to another.

* * * * *